United States Patent
Cabrera et al.

(10) Patent No.: US 7,417,809 B2
(45) Date of Patent: Aug. 26, 2008

(54) METHOD, APPARATUS, AND ARTICLE FOR ADJUSTING OPTICAL DEVICE

(75) Inventors: Pierre Cabrera, Toulouse (FR); Pierre-Marie Manine, Pibrac (FR)

(73) Assignee: Intermec IP Corp., Everett, WA (US)

( * ) Notice: Subject to any disclaimer, the term of this patent is extended or adjusted under 35 U.S.C. 154(b) by 164 days.

(21) Appl. No.: 11/406,831

(22) Filed: Apr. 19, 2006

(65) Prior Publication Data

US 2006/0273638 A1 Dec. 7, 2006

Related U.S. Application Data

(60) Provisional application No. 60/672,785, filed on Apr. 19, 2005.

(51) Int. Cl.
*G02B 7/02* (2006.01)

(52) U.S. Cl. .................. 359/819; 359/822; 359/823

(58) Field of Classification Search .......... 359/819–823
See application file for complete search history.

(56) References Cited

U.S. PATENT DOCUMENTS

| | | | |
|---|---|---|---|
| 6,016,230 A | 1/2000 | Nunnally et al. | 359/819 |
| 6,283,420 B1 | 9/2001 | Neuber, Jr. | 248/125.2 |
| 6,597,516 B2 | 7/2003 | Saitoh et al. | 359/694 |
| 6,665,129 B2 * | 12/2003 | Okuda et al. | 359/700 |
| 6,825,991 B2 * | 11/2004 | Takanashi et al. | 359/696 |
| 6,965,486 B2 * | 11/2005 | Lee | 359/819 |
| 2002/0149859 A1 * | 10/2002 | Muto et al. | 359/694 |

* cited by examiner

*Primary Examiner*—Mohammed Hasan
(74) *Attorney, Agent, or Firm*—Seed IP Law Group PLLC

(57) ABSTRACT

An optical assembly includes a first tubular member having a pitched bearing surface proximate one end; a second tubular member having a pitched bearing surface proximate one end; a coupling tubular member fixedly coupled to the second tubular member and rotatably and slideably coupled to the first tubular member; and an optical element received in at least one of the first, the second or the coupling tubular members. At least a portion of the pitched bearing surface of the first tubular member is in engaging contact with at least a portion of the pitched bearing surface of the second tubular member. Rotating the first tubular member with respect to the second tubular member smoothly varies a distance between the first and second tubular members and allows a large, smooth adjustment with little effort. Rotation in a single direction returns the distances to an initial starting point.

20 Claims, 5 Drawing Sheets

US 7,417,809 B2

METHOD, APPARATUS, AND ARTICLE FOR ADJUSTING OPTICAL DEVICE

CROSS REFERENCES TO RELATED APPLICATIONS

This application claims benefit under 35 U.S.C. § 119(e) from U.S. Provisional Patent Application No. 60/672,785, filed Apr. 19, 2005.

BACKGROUND OF THE INVENTION

1. Field of the Invention

The method, apparatuses, and articles described herein generally relate to optical devices, and may, for example, be useful in automatic data collection devices such as optical readers of machine-readable symbols.

2. Description of the Related Art

At present, the most prevalent method of adjusting an optical device appears to employ threaded screws. However, adjusting an optical device through use of a screw has a number of disadvantages.

For example, the amount of time and effort required to make an adjustment is disproportionately high relative to the amount of adjustment actually provided. Numerous repeated rotations of the screw are often necessary to achieve the desired adjustment. For example, movement of a lens from one end of the adjustment range to the other end of the adjustment range may take ten rotations of the screw. If, at that point, the user desires to move the lens back to its initial position, the user must rotate the screw ten more times in the opposite direction. In some situations, due to either space constraints or user limitations, it may be difficult to affect both clockwise and counterclockwise rotation with comparative ease. And if the user rotates the screw too far in one direction while the lens is near either end of the adjustment range, the optical device loses the smooth ability to focus.

Furthermore, a screw is typically offset from the optical axis. Such an arrangement may cause misalignment or unequal forces in the carriage mechanism, and/or may require adjustment of multiple screws.

Optical assemblies and methods of manufacturing the same, which address at least some of the aforementioned problems, would be desirable.

BRIEF SUMMARY OF THE INVENTION

In one aspect, an optical assembly comprises a first tubular member having a first end, a second end opposite the first end, a longitudinal passage extending between the first and second ends along a longitudinal axis of the first tubular member, and a pitched bearing surface proximate the second end, the pitched bearing surface disposed about the longitudinal axis of the first tubular member such that the pitched bearing surface of the first tubular member is not perpendicular to the longitudinal axis of the first tubular member; a second tubular member having a first end, a second end opposite the first end, a longitudinal passage extending between the first and second ends along a longitudinal axis of the second tubular member, and a pitched bearing surface proximate the second end, the pitched bearing surface disposed about the longitudinal axis of the second tubular member such that the pitched bearing surface of the second tubular member is not perpendicular to the longitudinal axis of the second tubular member; a coupling tubular member having a first end, a second end opposite the first end, a longitudinal passage extending between the first and second ends along a longitudinal axis of the coupling tubular member, the coupling tubular member fixedly coupled to the second tubular member for rotation therewith about the longitudinal axis of the second tubular member, the coupling tubular member rotatably and slideably coupled to the first tubular member, with at least a portion of the pitched bearing surface of the first tubular member in engaging contact with at least a portion of the pitched bearing surface of the second tubular member, such that rotation of the first tubular member with respect to the second tubular member varies a distance between the first end of the first tubular member and the first end of the second tubular member; and at least one optical element received in the longitudinal passage of at least one of the first, the second or the coupling tubular members.

In another aspect, an optical assembly comprises a first tubular member having a first end, a second end opposite the first end, a longitudinal passage extending between the first and second ends along a longitudinal axis of the first tubular member, and an endless pitched bearing surface proximate the second end, the pitched bearing surface disposed non-perpendicularly about the longitudinal axis of the first tubular member; a second tubular member having a first end, a second end opposite the first end, a longitudinal passage extending between the first and second ends along a longitudinal axis of the second tubular member, and an endless pitched bearing surface proximate the second end, the pitched bearing surface disposed non-perpendicularly about the longitudinal axis of the second tubular member; a coupling tubular member having a first end, a second end opposite the first end, a longitudinal passage extending between the first and second ends along a longitudinal axis of the coupling tubular member, the coupling tubular member fixedly coupled to the second tubular member for rotation therewith about the longitudinal axis of the second tubular member, the coupling tubular member rotatably and slideably coupled to the first tubular member, with at least a portion of the pitched bearing surface of the first tubular member in engaging contact with at least a portion of the pitched bearing surface of the second tubular member; and at least one optical element coupled to at least one of the first, the second or the coupling tubular members for movement therewith.

In a further aspect, a method of making an optical assembly comprises providing a first tubular member having a first end, a second end opposite the first end, a longitudinal passage extending between the first and second ends along a longitudinal axis of the first tubular member, and an endless pitched bearing surface proximate the second end, the pitched bearing surface disposed about the longitudinal axis of the first tubular member such that the pitched bearing surface of the first tubular member is not perpendicular to the longitudinal axis of the first tubular member; providing a second tubular member having a first end, a second end opposite the first end, a longitudinal passage extending between the first and the second ends along a longitudinal axis of the second tubular member, and an endless pitched bearing surface proximate the second end, the pitched bearing surface disposed about the longitudinal axis of the second tubular member such that the pitched bearing surface of the second tubular member is not perpendicular to the longitudinal axis of the second tubular member; providing a coupling tubular member having a first end, a second end opposite the first end, a longitudinal passage extending between the first and the second ends along a longitudinal axis of the coupling tubular member; fixedly coupling the coupling tubular member to the second tubular member for rotation therewith about the longitudinal axis of the second tubular member; rotatably and slideably coupling the coupling tubular member to the first tubular member with at least a portion of the pitched bearing surface of the first tubular member in engaging contact with at least a portion of the pitched bearing surface of the second tubular member; providing at least one optical element; and coupling the at least one optical element to at least one of the first, the second or the coupling tubular members for movement therewith.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with optical devices and optical elements have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
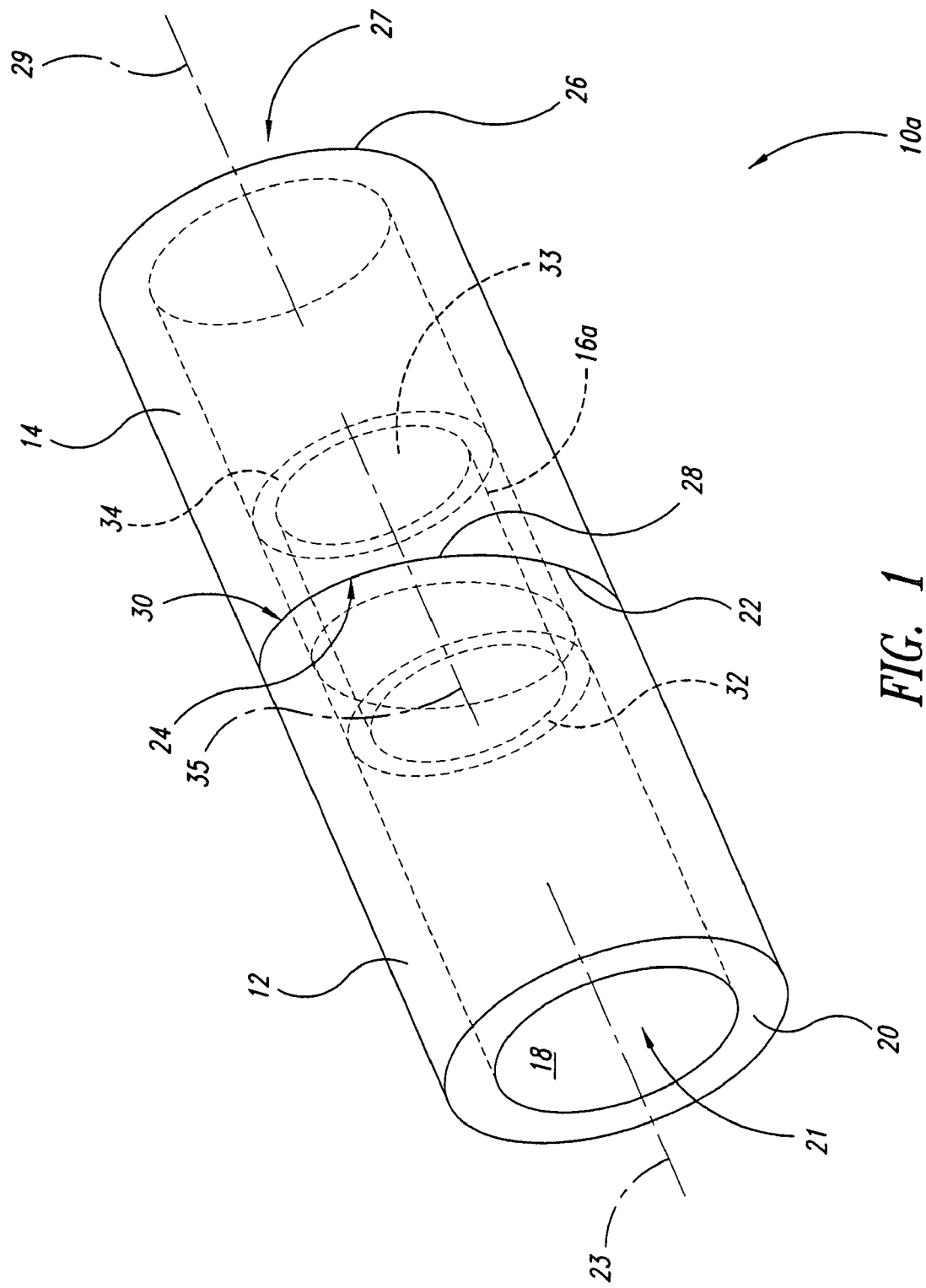
FIG. 1 is an isometric view of an exemplary optical assembly having an internal coupling member according to one illustrated embodiment.
Figure 2:
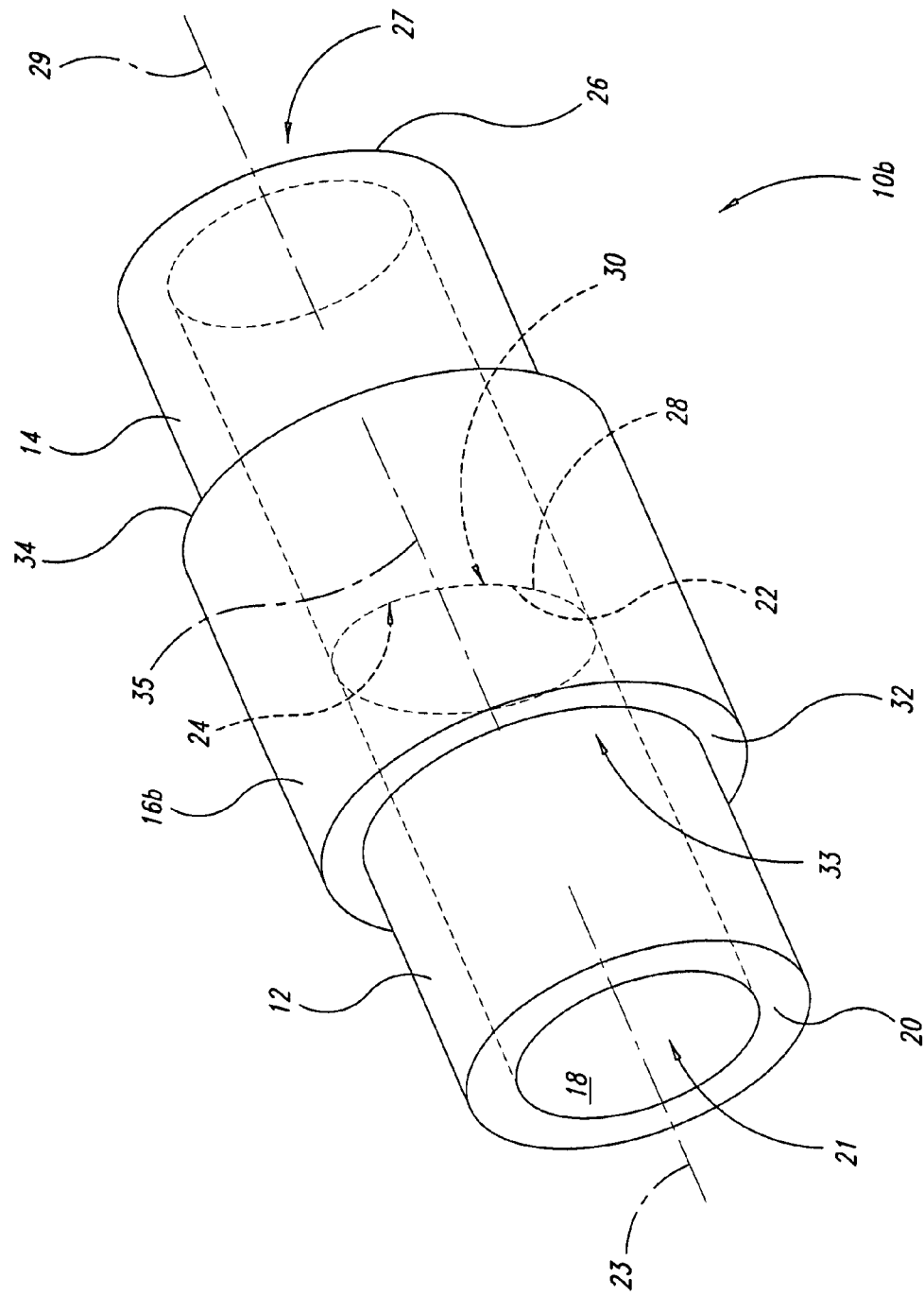
FIG. 2 is an exploded view of the optical assembly of FIG. 1.

FIGS. 1 and 2 show an optical assembly 10a according to one embodiment. The optical assembly 10a is comprised of a first tubular member 12, a second tubular member 14, a coupling tubular member 16a, and an optical element 18.

The first tubular member 12 comprises a first end 20, a second end 22, and a longitudinal passage 21 extending between the first end 20 and second end 22 along a longitudinal axis 23 of the first tubular member 12. The first tubular member 12 may be formed of one or more of a variety of materials, including but not limited to metals, plastics, and/or composites. In at least one embodiment, the first tubular member 12 has a circular cross-section taken substantially perpendicularly to the longitudinal axis 23 of the first tubular member 12. The first tubular member 12 has a pitched bearing surface 24 proximate the second end 22, and disposed about the longitudinal axis 23 of the first tubular member 12 such that the pitched bearing surface 24 of the first tubular member 12 is not perpendicular to the longitudinal axis 23 of the first tubular member 12. In at least one embodiment, the pitched bearing surface 24 is a closed or endless surface. A closed, or endless, pitched bearing surface is defined to include a pitched surface with no terminus. The angle formed between the pitched bearing surface 24 and the cross-section of the first tubular member 12 may be twenty degrees or any other suitable angle.

Similarly, the second tubular member 14 comprises a first end 26, a second end 28, and a longitudinal passage 27 extending between the first end 26 and second end 28 along a longitudinal axis 29 of the second tubular member 14. The second tubular member 14 may be formed of one or more of a variety of materials, including but not limited to metals, plastics, and/or composites. In at least one embodiment, the second tubular member 14 has a circular cross-section taken substantially perpendicularly to the longitudinal axis 29 of the second tubular member 14. In at least one embodiment, the longitudinal axes 23, 29 of the first tubular member 12 and second tubular member 14, respectively, are coaxial. The second tubular member 14 has a pitched bearing surface 30 proximate the second end 28, and disposed about the longitudinal axis 29 of the second tubular member 14 such that the pitched bearing surface 30 of the second tubular member 14 is not perpendicular to the longitudinal axis 29 of the second tubular member 14. In at least one embodiment, the pitched bearing surface 30 is a closed surface.

The coupling tubular member 16a also has a first end 32, a second end 34, and a longitudinal passage 33 extending between the first end 32 and second end 34 along a longitudinal axis 35 of the coupling tubular member 16a. The coupling tubular member 16a may be formed of one or more of a variety of materials, including but not limited to metals, plastics, and/or composites. In at least one embodiment, the coupling tubular member 16a has a circular cross-section taken substantially perpendicularly to the longitudinal passage 33 of the coupling tubular member 16a.

The coupling tubular member 16a is fixedly coupled to the second tubular member 14 for rotation therewith about the longitudinal axis 29 of the second tubular member 14. In at least one embodiment, the coupling tubular member 16a is press fit to the second tubular member 14. The coupling tubular member 16a is rotatably and slideably coupled to the first tubular member 12.

In the specific embodiment of FIGS. 1 and 2, the first end 32 of coupling tubular member 16a is secured within the longitudinal passage 21 of the first tubular member 12, for example by press fitting. The second end 34 of the coupling tubular member 16a is rotatably and slideably received within the longitudinal passage 27 of the second tubular member 14. Portions of the coupling tubular member 16a are shown in broken line to indicate the location of the first end 32 of the coupling tubular member 16a within the first tubular member 12 and the second end 34 of the coupling tubular member 16a within the second tubular member 14.

In operation, at least a portion of the pitched bearing surface 30 of the second tubular member 14 is in engaging contact with at least a portion of the pitched bearing surface 24 of the first tubular member 12. Rotation of the first tubular member 12 with respect to the second tubular member 14 smoothly varies a distance between the first end 20 of the first tubular member 12 and a first end 26 of the second tubular member 14. In at least one embodiment, the closed nature of at least one of the pitched bearing surfaces 24 and 30 allows the optical assembly to achieve both full extension and full retraction without reversing rotational direction.

While the optical element 18 is illustrated as received within the first tubular member 12, the optical element 18 or additional optical elements may be received in the second tubular member 14 or the coupling tubular member 16. In at least one embodiment, the optical element 18 may, for example, comprise one or more lenses mounted in the longitudinal passage 21, 27, 33 of the first, the second and/or the coupling tubular members 12, 14, 16, respectively. In at least one embodiment, at least one optical element 18 is proximate the first end 20 of the first tubular member 12.

Figure 3:
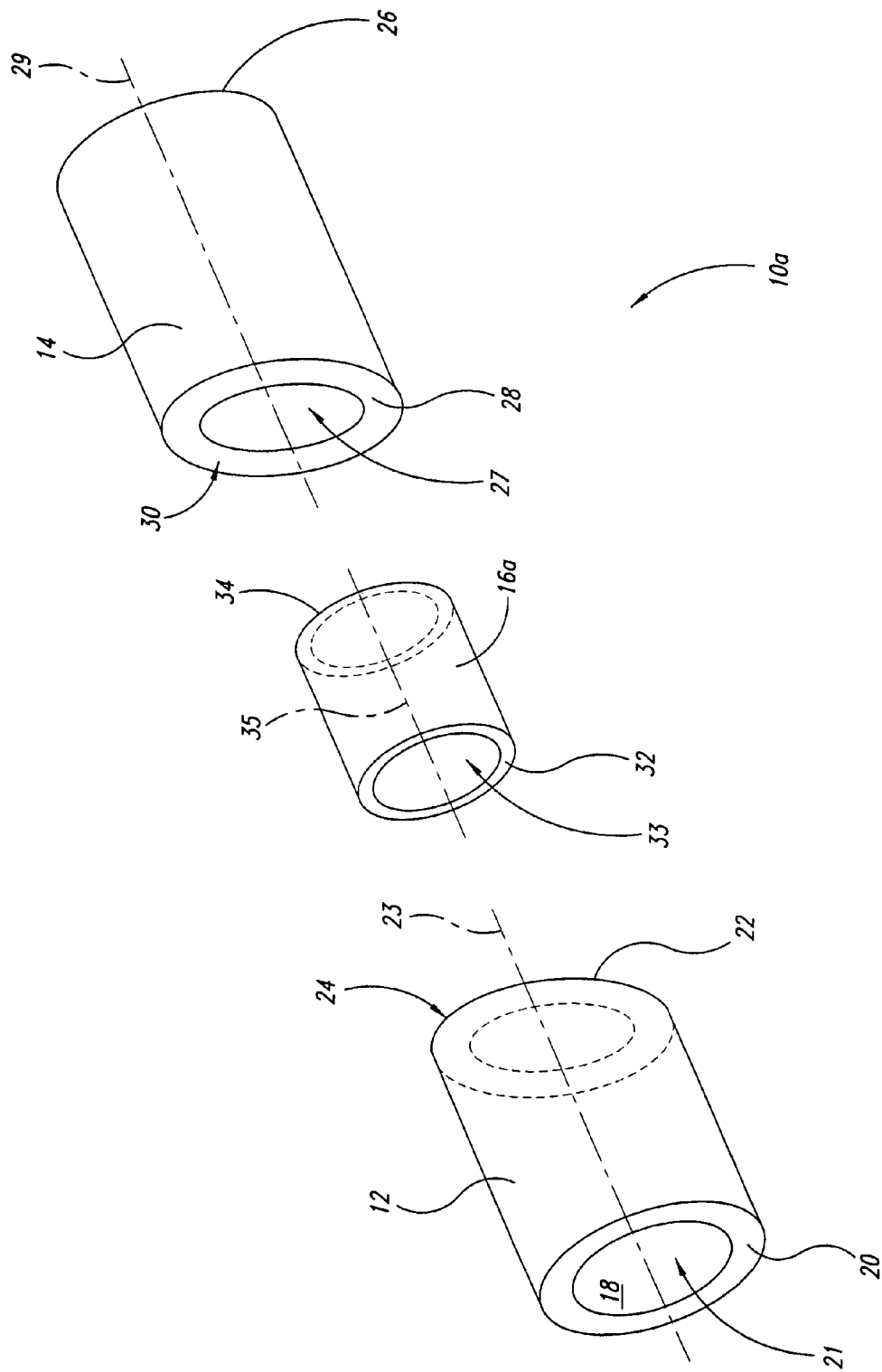
FIG. 3 is an isometric view of an exemplary optical assembly having an external coupling member according to another illustrated embodiment.

FIG. 3 shows an alternative optical assembly 10b. This alternative embodiment, and those alternative embodiments and other alternatives described herein, are substantially similar to previously described embodiments, and common acts and structures are identified by the same reference numbers. Only significant differences in operation and structure are described below.

FIG. 3 shows an embodiment in which the structure of the first tubular member 12, second tubular member 14, and optical element 18 are similar to the elements described in FIG. 1. However, the embodiment employs a larger coupling tubular member 16b. Additionally, in the specific embodiment of FIG. 3, the second end 22 of the first tubular member 12 and the second end 28 of the second tubular member 14 are both received within the longitudinal passage 33 of the coupling tubular member 16b. Portions of the first tubular member 12 and second tubular member 14 are shown in broken line in FIG. 3 to indicate the location of the those portions within the coupling tubular member 16b for the specific embodiment of FIG. 3.

The coupling tubular member 16b is fixedly coupled to the second tubular member 14 for rotation therewith about the longitudinal axis 29 of the second tubular member 14. In at least one embodiment, the second tubular member 14 is press fit into the longitudinal passage 33 of the coupling tubular member 16b. The first tubular member 12 is rotatably and slideably received in the coupling tubular member 16b. In operation, at least a portion of the pitched bearing surface 30 of the second tubular member 14 is in engaging contact with at least a portion of the pitched bearing surface 24 of the first tubular member 12. Rotation of the first tubular member 12 with respect to the second tubular member 14 smoothly varies a distance between the first end 20 of the first tubular member 12 and a first end 26 of the second tubular member 14. In at least one embodiment, the closed nature of at least one of the pitched bearing surfaces 24 and 30 allows the optical assembly to achieve both full extension and full retraction without reversing rotational direction.

The optical element 18 is received either within the first tubular member 12 or the second tubular member 14. In at least one embodiment, the optical element 18 may, for example, comprise one or more lenses mounted in the longitudinal passage of the first tubular member 12. In at least one embodiment, at least one lens is proximate the first end 20 of the first tubular member 12.

Figure 4:
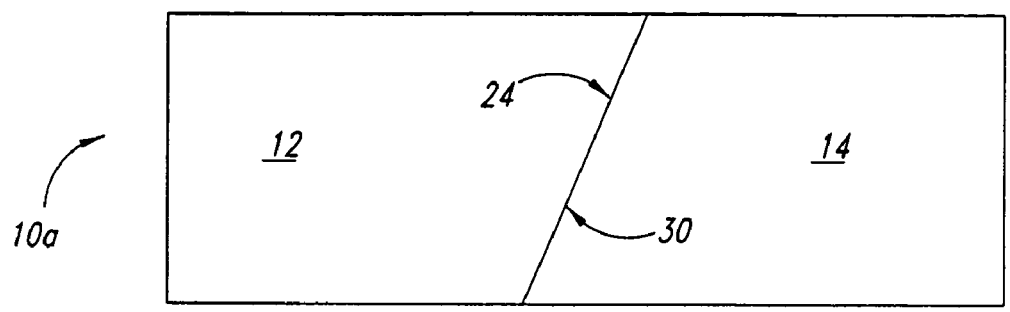
FIG. 4 is a side elevational view of an exemplary optical assembly in a non-extended state according to one illustrated embodiment.

FIG. 4 shows the optical assembly 10a in a non-extended state according to one embodiment. The structure of first tubular member 12, second tubular member 14, coupling tubular member (not specifically illustrated in FIG. 4), and optical element 18 (not specifically illustrated in FIG. 4) are as described in FIGS. 1 and 2. In the non-extended state, the distance between the first end 20 of first tubular member 12 and the first end 26 of second tubular member 14 is at a minimum. Additionally, pitched bearing surface 24 of first tubular member 12 and pitched bearing surface 30 of second tubular member 14 are in substantially complete contact over their entire surfaces.

Figure 5:
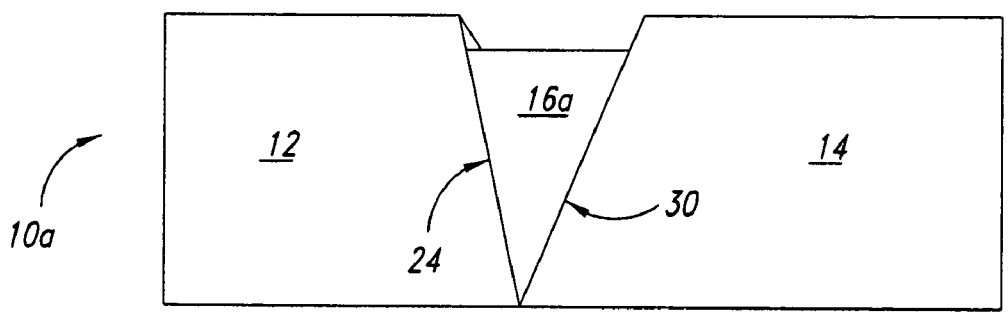
FIG. 5 is a side elevational view of an exemplary optical assembly in an intermediate state between a non-extended state and a fully extended state according to one illustrated embodiment.

FIG. 5 shows the optical assembly 10a in an intermediate state between a non-extended state and a fully extended state according to one embodiment. The structure of first tubular member 12, second tubular member 14, coupling tubular member (not specifically illustrated in FIG. 5), and optical element 18 (not specifically illustrated in FIG. 5) are as described in FIGS. 1 and 2. In the intermediate state of adjustability, the distance between the first end 20 of first tubular member 12 and the first end 26 of second tubular member 14 is neither at a minimum nor a maximum. Additionally, pitched bearing surface 24 of first tubular member 12 and pitched bearing surface 30 of second tubular member 14 are in partial contact.

Figure 6:
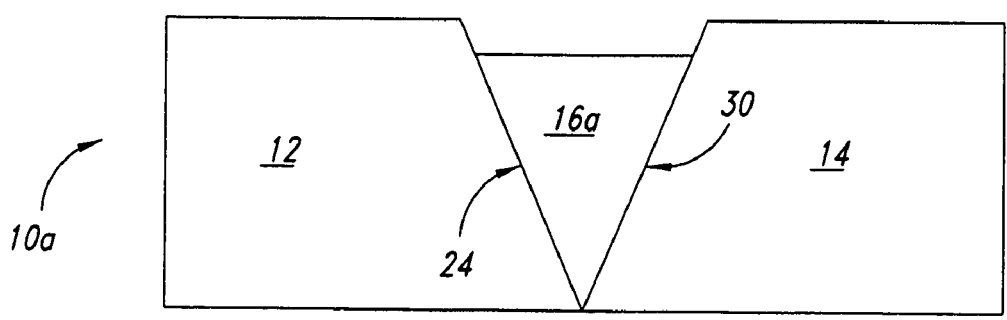
FIG. 6 is a side elevational view of an exemplary optical assembly in a fully extended state according to one illustrated embodiment.

FIG. 6 shows the optical assembly 10a in a fully extended state, according to one embodiment. The structure of first tubular member 12, second tubular member 14, coupling tubular member 16 (not specifically illustrated in FIG. 6), and optical element 18 (not specifically illustrated in FIG. 6) are as described in FIGS. 1 and 2. In the fully extended state, the distance between the first end 20 of first tubular member 12 and the first end 26 of second tubular member 14 is at a maximum. Additionally, pitched bearing surface 24 of first tubular member 12 is in minimal contact with the pitched bearing surface 30 of second tubular member 14.

Figure 7:
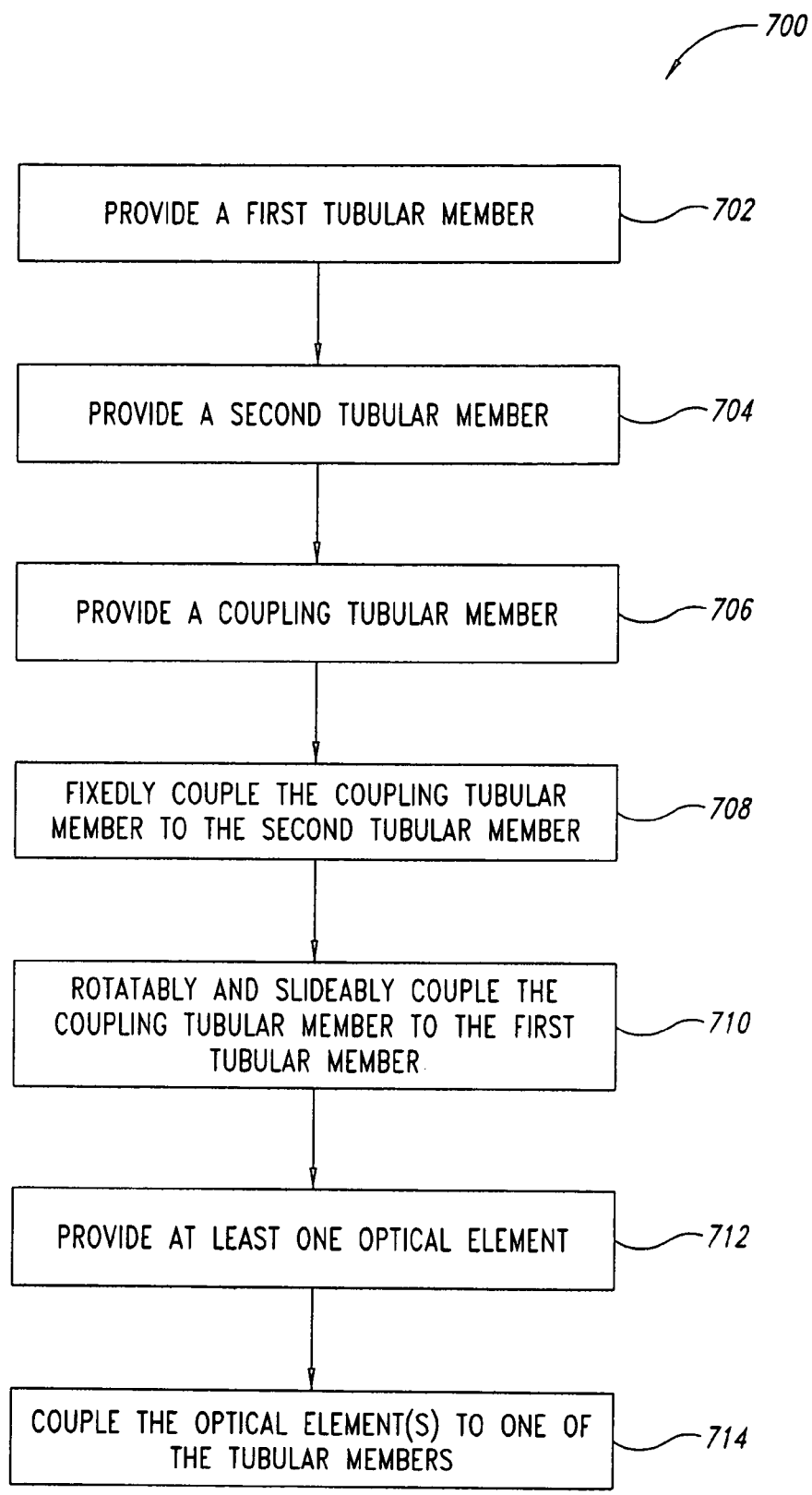
FIG. 7 is a flow diagram showing a method of making an optical assembly, according to one illustrated embodiment.

FIG. 7 is a flow diagram showing a high-level method 700 of making an exemplary optical assembly 10a, 10b according to one illustrated embodiment, starting at 702.

At 702, a first tubular member 12 is provided. The first tubular member 12 may be similar to the first tubular member 12 illustrated in the attached drawings, or it can take other forms consistent with the spirit and scope of the invention.

At 704, a second tubular member 14 is provided. The second tubular member 14 can be similar to the second tubular member 14 illustrated in the attached drawings, or it can take other forms consistent with the spirit and scope of the invention.

At 706, a coupling tubular member 16 is provided. The coupling tubular member 16 can be provided in one of many different forms. By way of example and not limitation, it can be similar to the coupling tubular member 16a of FIGS. 1 and 2, or it can be more similar to the coupling tubular member 16b of FIG. 3.

At 708, the coupling tubular member 16 is fixedly coupled to the second tubular member 14. One method of coupling the two components is by press fitting one to the other, although other methods of coupling may be used and are within the spirit and scope of the invention. The second tubular member 14 may receive the coupling tubular member 16 as shown in FIGS. 1 and 2, or the coupling tubular member 16 may receive the second tubular member as shown in FIG. 3.

At 710, the coupling tubular member 16 is rotatably and slideably coupled to the first tubular member 12. In a non-extended state of optic assembly 10, the first end 20 of the first tubular member 12 is at a minimum distance from the first end 26 of the second tubular member 14. In a fully extended state of optic assembly 10, the first end 20 of the first tubular member 12 is at a maximum distance from the first end 26 of the second tubular member 14.

At 712, at least one optical element 18 is provided. The optical element 18 may take the form of one or more lenses, prisms, reflectors, refractors, apertures and/or filters, or any other optical element.

At 714, the one or more optical elements are coupled to the first tubular member 12, the second tubular member 14, and/or the coupling tubular member 16. If more than one optical element is provided, they may be coupled to different tubular members or to the same tubular member 12, 14, 16.

The above description of illustrated embodiments, including what is described in the Abstract, is not intended to be exhaustive or to limit the invention to the precise forms disclosed. Although specific embodiments of and examples are described herein for illustrative purposes, various equivalent modifications can be made without departing from the spirit and scope of the invention, as will be recognized by those skilled in the relevant art. The teachings provided herein of the invention can be applied to other optical assemblies, not necessarily the exemplary optical assembly generally described above. For example, the teaching may apply to an optical assembly having additional tubular members and tubular coupling members. The teaching may apply to tubular members having non-circular cross-sections, including but not limited to elliptical, square, rectangular, or hexagonal cross-sections. Further, the acts of method 700 may occur in a different order, and the method 700 may omit some acts and/or include additional acts.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. provisional patent application Ser. No. 60/672,785, are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all assemblies, and methods of manufacturing the same, that accord with the claims. Accordingly, the invention is not limited by the disclosure, but instead its scope is to be determined entirely by the following claims.

The invention claimed is:

1. An optical assembly, comprising:
  a first tubular member having a first end, a second end opposite the first end, a longitudinal passage extending between the first and the second ends along a longitudinal axis of the first tubular member, and a pitched bearing surface proximate the second end, the pitched bearing surface disposed about the longitudinal axis of the first tubular member such that the pitched bearing surface of the first tubular member is not perpendicular to the longitudinal axis of the first tubular member;
  a second tubular member having a first end, a second end opposite the first end, a longitudinal passage extending between the first and the second ends along a longitudinal axis of the second tubular member, and a pitched bearing surface proximate the second end, the pitched bearing surface disposed about the longitudinal axis of the second tubular member such that the pitched bearing surface of the second tubular member is not perpendicular to the longitudinal axis of the second tubular member;
  a coupling tubular member having a first end, a second end opposite the first end, a longitudinal passage extending between the first and the second ends along a longitudinal axis of the coupling tubular member, the coupling tubular member fixedly coupled to the second tubular member for rotation therewith about the longitudinal axis of the second tubular member, the coupling tubular member rotatably and slideably coupled to the first tubular member, with at least a portion of the pitched bearing surface of the first tubular member in engaging contact with at least a portion of the pitched bearing surface of the second tubular member, such that rotation of the first tubular member with respect to the second tubular member varies a distance between the first end of the first tubular member and the first end of the second tubular member; and
  an optical element received in the longitudinal passage of at least one of the first, the second or the coupling tubular members.

2. The optical assembly of claim 1 wherein the pitched bearing surface of the first tubular member is a closed surface, and wherein the pitched bearing surface of the second tubular member is a closed surface.

3. The optical assembly of claim 1 wherein the second end of the first tubular member is received within the longitudinal passage of the coupling tubular member and the second end of the second tubular member is received within the longitudinal passage of the coupling tubular member.

4. The optical assembly of claim 1 wherein the first end of the coupling tubular member is received within the longitudinal passage of the first tubular member and the second end of the coupling tubular member is received within the longitudinal passage of the second tubular member.

5. The optical assembly of claim 1 wherein the first, the second and the coupling tubular members each have a respective circular cross-section, perpendicular to the respective longitudinal axis of the first, the second and the coupling tubular members.

6. The optical assembly of claim 1 wherein the longitudinal axes of the first and the second tubular members are coaxial.

7. The optical assembly of claim 1 wherein the coupling tubular member is press fit to the second tubular member.

8. The optical assembly of claim 1 wherein the optical element comprises at least one lens mounted in the longitudinal passage of the first tubular member.

9. The optical assembly of claim 8 wherein the at least one lens is proximate the first end of the first tubular member.

10. An optical assembly, comprising:
  a first tubular member having a first end, a second end opposite the first end, a longitudinal passage extending between the first and the second ends along a longitudinal axis of the first tubular member, and an endless pitched bearing surface proximate the second end, the pitched bearing surface disposed non-perpendicularly about the longitudinal axis of the first tubular member;

a second tubular member having a first end, a second end opposite the first end, a longitudinal passage extending between the first and the second ends along a longitudinal axis of the second tubular member, and an endless pitched bearing surface proximate the second end, the pitched bearing surface disposed non-perpendicularly about the longitudinal axis of the second tubular member;

a coupling tubular member having a first end, a second end opposite the first end, a longitudinal passage extending between the first and the second ends along a longitudinal axis of the coupling tubular member, the coupling tubular member fixedly coupled to the second tubular member for rotation therewith about the longitudinal axis of the second tubular member, the coupling tubular member rotatably and slideably coupled to the first tubular member, with at least a portion of the pitched bearing surface of the first tubular member in engaging contact with at least a portion of the pitched bearing surface of the second tubular member; and an optical element coupled to at least one of the first, the second or the coupling tubular members for movement therewith.

11. The optical assembly of claim 10 wherein rotation of the first tubular member with respect to the second tubular member varies a distance between the first end of the first tubular member and the first end of the second tubular member.

12. The optical assembly of claim 10 wherein the second end of the first tubular member is received within the longitudinal passage of the coupling tubular member and the second end of the second tubular member is received within the longitudinal passage of the coupling tubular member.

13. The optical assembly of claim 10 wherein the first end of the coupling tubular member is received within the longitudinal passage of the first tubular member and the second end of the coupling tubular member is received within the longitudinal passage of the second tubular member.

14. The optical assembly of claim 10 wherein at least one of the first, the second and the coupling tubular members has a circular cross-section, perpendicular to the respective longitudinal axis of the first, the second and the coupling tubular members.

15. The optical assembly of claim 10 wherein the longitudinal axes of the first and the second tubular members are coaxial.

16. The optical assembly of claim 10 wherein the coupling tubular member is press fit to the second tubular member.

17. The optical assembly of claim 10 wherein the optical element comprises at least one lens mounted in the longitudinal passage of the first tubular member, proximate the first end thereof.

18. A method of making an optical assembly, comprising:

providing a first tubular member having a first end, a second end opposite the first end, a longitudinal passage extending between the first and the second ends along a longitudinal axis of the first tubular member, and an endless pitched bearing surface proximate the second end, the pitched bearing surface disposed about the longitudinal axis of the first tubular member such that the pitched bearing surface of the first tubular member is not perpendicular to the longitudinal axis of the first tubular member;

providing a second tubular member having a first end, a second end opposite the first end, a longitudinal passage extending between the first and the second ends along a longitudinal axis of the second tubular member, and an endless pitched bearing surface proximate the second end, the pitched bearing surface disposed about the longitudinal axis of the second tubular member such that the pitched bearing surface of the second tubular member is not perpendicular to the longitudinal axis of the second tubular member;

providing a coupling tubular member having a first end, a second end opposite the first end, a longitudinal passage extending between the first and the second ends along a longitudinal axis of the coupling tubular member;

fixedly coupling the coupling tubular member to the second tubular member for rotation therewith about the longitudinal axis of the second tubular member;

rotatably and slideably coupling the coupling tubular member to the first tubular member with at least a portion of the pitched bearing surface of the first tubular member in engaging contact with at least a portion of the pitched bearing surface of the second tubular member;

providing at least one optical element; and coupling the at least one optical element to at least one of the first, the second or the coupling tubular members for movement therewith.

19. The method of claim 18 wherein fixedly coupling the coupling tubular member to the second tubular member for rotation therewith comprises press fitting the second end of the second tubular member within the longitudinal passage of the coupling tubular member.

20. The method of claim 18 wherein fixedly coupling the coupling tubular member to the second tubular member for rotation therewith comprises press fitting the second end of the coupling tubular member within the longitudinal passage of the second tubular member.

* * * * *